United States Patent
Koenigseder et al.

(10) Patent No.: US 9,400,706 B2
(45) Date of Patent: Jul. 26, 2016

(54) METHOD AND DEVICE FOR MONITORING AN ADAPTIVE NETWORK

(71) Applicant: Bayerische Motoren Werke Aktiengesellschaft, Munich (DE)

(72) Inventors: Thomas Koenigseder, Wilfling (DE); Albrecht Neff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 221 days.

(21) Appl. No.: 14/310,948

(22) Filed: Jun. 20, 2014

(65) Prior Publication Data

US 2014/0325288 A1    Oct. 30, 2014

Related U.S. Application Data

(63) Continuation of application No. PCT/EP2012/075945, filed on Dec. 18, 2012.

(30) Foreign Application Priority Data

Dec. 21, 2011    (DE) .......................... 10 2011 089 397

(51) Int. Cl.
*G06F 11/00* (2006.01)
*G06F 11/07* (2006.01)
*H04L 1/20* (2006.01)

(52) U.S. Cl.
CPC .......... *G06F 11/076* (2013.01); *G06F 11/0751* (2013.01); *G06F 11/0754* (2013.01); *H04L 1/20* (2013.01)

(58) Field of Classification Search
CPC ............ G06F 11/0751; G06F 11/0754; G06F 11/076; H04L 1/20
See application file for complete search history.

(56) References Cited

U.S. PATENT DOCUMENTS 5,862,145 A    1/1999    Grossman et al.
8,294,474 B2    10/2012    Ahrens et al.
(Continued)

FOREIGN PATENT DOCUMENTS

DE         103 49 600 A1    5/2004
DE    10 2004 053 238 A1    5/2006
(Continued)

OTHER PUBLICATIONS

International Search Report dated Mar. 21, 2013 (Four (4) pages).
(Continued)

*Primary Examiner* — Joshua P Lottich
(74) *Attorney, Agent, or Firm* — Crowell & Moring LLP

(57) ABSTRACT

An adaptive network has respective network nodes and network connections between the network nodes, the network nodes each having a transceiver which is coupled with a respective network connection. The respective transceiver is designed for providing a mean error value (MSE_i) which is representative of deviations of a received signal from predefined reference signal values. In a reference operating state of the adaptive network, a respective reference error value (MSE_REF) is determined as a function of the mean error value (MSE_i) provided by the respective transceiver. In at least one predefined operating state of the adaptive network, a respective actual error value (MSE_AV) is determined as a function of the mean error value (MSE_i) provided by the respective transceiver. As a function of the respective reference error value (MSE_REF) and the assigned actual error value (MSE_AV), it is determined whether a fault is present in the respective network connection which is coupled with the respective transceiver.

15 Claims, 2 Drawing Sheets

(56) References Cited

U.S. PATENT DOCUMENTS

| | | | |
|---|---|---|---|
| 8,677,019 | B2 | 3/2014 | Bruenner et al. |
| 2002/0080886 | A1 | 6/2002 | Ptasinski et al. |
| 2004/0158781 | A1 | 8/2004 | Pihet |
| 2005/0271137 | A1 | 12/2005 | Kolze et al. |
| 2007/0030841 | A1* | 2/2007 | Lee .................. G01S 5/0027 370/352 |
| 2007/0258517 | A1 | 11/2007 | Rollings et al. |
| 2008/0126413 | A1* | 5/2008 | Addleman .......... G06F 11/0709 |

FOREIGN PATENT DOCUMENTS

| | | |
|---|---|---|
| DE | 10 2006 011 829 A1 | 9/2007 |
| DE | 10 2006 013 911 A1 | 9/2007 |
| DE | 10 2006 048 073 A1 | 4/2008 |
| EP | 2 312 783 B1 | 4/2011 |

OTHER PUBLICATIONS

German-language Search Report dated Dec. 20, 2012, with partial English translation (Ten (10) pages).

Hans-Werner Schaal, "IP and Ethernet in Motor Vehicles", Vector Informatik GmbH Stuttgart, Germany, Apr. 23, 2012, pp. 1-7, XP002693355, URL: http://www.vector.com/portal/medien/cmc/press/PON/Ethernet__IP__ElektronikAutomotive__201204__PressArticle__EN.pdf.

Hans-Werner Schaal, "Ethernet und IP im Kraftfahrzeug", Elektronik automotive 4.2012 / elektroniknet.de Elektronik automotive, Apr. 13, 2012, pp. 38-41, XP002693354, URL: http://www.vector.com/portal/medien/cmc/press/PON/Ethernet__IP__ElektronikAutomotive__201204__PressArticle__DE.pdf.

Kai Kurt Mueller, "Time-Triggered Ethernet fuer eingebettete Systeme: Design, Umsetzung und Validierung einer echtzeitfaehigen Netzwerkstack-Architektur", Hochschule fuer Angewandte Wissenschaften Hamburg, Aug. 30, 2011, pp. i-70 (76 total pages), XP002693353, URL http://core.informatik.haw-hamburg.de/images/publications/theses/m-ttees-11.pdf.

Neff Albrecht et al., "Ethernet & IP als applikativer Fahrzeugbus am Einsatzszenario kamerabasierter Fahrerassistenzsysteme", Jan. 1, 2011, pp. 491-495 (5 pages), XP009167632, ISBN: 978-3-18-092132-7.

* cited by examiner

METHOD AND DEVICE FOR MONITORING AN ADAPTIVE NETWORK

CROSS REFERENCE TO RELATED APPLICATIONS

This application is a continuation of PCT International Application No. PCT/EP2012/075945, filed Dec. 18, 2012, which claims priority under 35 U.S.C. §119 from German Patent Application No. 10 2011 089 397.0, filed Dec. 21, 2011, the entire disclosures of which are herein expressly incorporated by reference.

BACKGROUND AND SUMMARY OF THE INVENTION

The invention relates to a method and a system for monitoring an adaptive network having respective network nodes and network connections between the network nodes, the network nodes each having a transceiver which is coupled with a respective network connection.

Modern motor vehicles have a plurality of regulating and control devices and, furthermore, also a plurality of sensors which, for example, may also one or more video cameras, and devices for the purpose of information transmission or entertainment of vehicle occupants, such as a radio and/or a video playback device. Furthermore, navigation devices are also regularly used in modern motor vehicles. An efficient operation of these devices requires a data transmission system with a high data transmission rate.

Up to now, different bus systems have frequently been used in motor vehicles, such as the Local Interconnect Network (LIN), the Controller Area Network (CAN) or the FlexRay. With an increasing complexity of the regulating and control devices and with a growing number of the above-mentioned devices, the demand for networks, which have an expanded protocol range, for example, the need for Ethernet networks, is rising. Such networks, for example, according to the Ethernet standard, are adaptive in the sense that they can compensate certain interference influences, which, for example, may be caused by an interference irradiation onto the network connection between the respective network nodes. This makes them particularly interesting for use in motor vehicles.

However, particularly for the use in motor vehicles, it is desirable for networks to operate reliably but, on the other hand, to also avoid units being subjected to an undesirable interference such as by a possibly occurring interference radiation.

It is an object of the invention to provide a method and a system for monitoring a network, which reliably detects, or detect faults in, the network connection between network nodes.

This and other objects are achieved by a method, and corresponding system, for monitoring an adaptive network having respective network nodes and network connections between the network nodes. The network nodes each have a transceiver, which is coupled to a respective network connection. The transceiver is designed for providing a mean error value, which is representative of deviations of a received signal from predefined reference signal values. In a reference operating state of the adaptive network, a respective reference error value is determined as a function of the average fault value provided by the respective transceiver. In at least one predefined operating state of the adaptive network, a respective actual error value is determined as a function of the mean error value provided by the respective transceiver. And, as a function of the respective reference error value and the assigned actual error value, it is determined whether a fault is present in the respective network connection which is coupled with the respective transceiver.

The invention is distinguished by a method and a corresponding system for monitoring an adaptive network with respective network nodes and network connections between the network nodes. The network nodes each have a transceiver which is coupled to a respective network connection. The respective transceiver is designed for providing a mean error value which is representative of deviations of a received signal from predefined reference signal values. In a reference operating state of the adaptive network, a respective reference error value is determined as a function of the mean error value provided by the respective transceiver. The reference operating state may, for example, exist when a motor vehicle, in which the adaptive network is arranged, is quasi finished, and is therefore, for example, situated at the end of the conveyor belt. The respective reference error value can then easily be determined in this manner.

In addition, in at least one predefined operating state of the adaptive network, a respective actual error value is determined as a function of the mean error value provided by the respective transceiver. Depending on the respective reference error value and the assigned actual error value, it is determined whether a fault is present in the respective network connection which is coupled with the respective transceiver. The predefined operating state and the reference operating state differ from one another.

On the one hand, in this manner, the advantage of the adaptive network can be utilized for compensating interferences which are caused, for example, by an interference irradiation onto the network connection between the network nodes; and, on the other hand, faults can be detected in the respective network connection which are caused, for example, by a poor cable connection, as a result of, for instance, aging and/or corrosion. In this fashion, the respective faulty component can then easily be identified and, if necessary, exchanged and/or repaired. It can thereby be avoided that, for example, also as a result of a changed radiation behavior of the network connections caused by the respective fault and/or a corresponding adaptation for the compensation of the fault, undesirably high interference radiations occur in the area of the network connection which, for example, may have reactive effects on other units, as, for example, interfere with radio reception.

According to an advantageous further development, a fault in the respective network connection will be recognized as a function of whether the amount of the deviation between the respective reference error value and the assigned actual error value exceeds a predefined threshold value. In this manner, the fault can easily but nevertheless reliably be recognized arithmetically.

In a further advantageous development, in the at least one predefined operating state, the then provided error value will be used for adapting the respective actual error value. In this fashion, the actual error value can easily be filtered, and brief outliers of the provided mean error value will not necessarily result in a detection of the fault in the respective network connection which then may possibly not have been correctly assigned. In this context, particularly the recognition is utilized that faults in the respective network connection are not reflected by a briefly deteriorated mean error value but rather by the latter correspondingly deviating from the reference error value for an extended period of time.

In this connection, it is particularly advantageous for the adaptation of the respective actual error value to be carried out in the form of a sliding average. This can be implemented particularly easily arithmetically, and results in a desired smoothing of the course of the actual value, which is advantageous with respect to a reliable recognition of a fault in the respective network connection.

In a further advantageous development, the respective provided mean error value is a quadratic mean error value.

According to a further advantageous development, the mean error values are corrected by means of a predefined filtering function as a basis for determining the respective reference error value and/or the respective actual error value. A contribution can thereby be made to preventing small deviations in the line quality of the network connection possibly resulting in undesirably large deviations of the respective mean error value. The predefined filtering function may, for example, comprise a linear quality function which may possibly be dependent on a transceiver type or a transceiver manufacturer or an installation site in the motor vehicle.

According to a further advantageous development, the adaptation of the respective actual error value takes place as a function of a predefined weighting of deviations of a predefined extent in the case of the mean error values or the mean error values corrected by means of the predefined filtering function.

According to a further advantageous development, it is checked in the reference operating state of the adaptive network whether the respective reference error value is in a predefined reference value range and, if that is not so, a fault is detected in the network connection or the respective network node. In this manner, it can easily be ensured that an already initially faulty adaptive network is at first considered to be fault-free.

According to a further advantageous development, the predefined operating state is a starting operation correlating with an engine start of a motor vehicle, in which the network is arranged. In this manner, a check can in each case easily take place at meaningfully predefined intervals concerning the presence of the fault in the respective network connection.

According to a further advantageous development, the predefined operating state is correlated with a change of a connection status of the respective network connection from a link-up status to a link-down status or vice-versa.

According to a further advantageous development, the predefined operating state is present in that those network nodes that are situated at the end points of the respective network connection have a predefined functional network node operating state.

According to a further advantageous development, the predefined operating state depends on the fact that at least one predefined vehicle function has a predefined state outside the network. The predefined vehicle function is, for example, characteristic of whether a source of particularly high electromagnetic interferences is either active or inactive in the proximity of the respective network connection. This contributes to obtaining a respective reproducible mean error value.

According to a further advantageous development, the adaptive network is Ethernet-based. This has the advantage that the Ethernet protocol is highly effective; it permits, for example, a data transmission of up to 100 Mbit/s. Furthermore, such a network can be implemented particularly cost-effectively, particularly in the context of network connections corresponding to UTSP (Unshielded Twisted Single Pair) which can comprise regular cost-effective cables and plug contacts.

According to a further aspect, a process and a corresponding system are provided for monitoring the adaptive network, wherein a respective reference error value (MSE_REF) is provided. In at least one predefined operating state of the adaptive network as a function of the mean error value provided by the respective transceiver, a respective actual error value is determined. As a function of the respect reference error value and the assigned actual error value, it is determined whether a fault is present in the respective network connection, which is coupled with the respective transceiver.

This particularly has the advantage that a learning of the reference fault value in the reference operating state will not be necessary. Thus, a checking of the network connection, as required, can already take place at the start of the operation and, as required, a fault can already be recognized at the point-in-time of the start of the operation, thus, for example, at the manufacturing facility of the vehicle. This approach may be particularly advantageous when, in the context of the predefined filtering function, the corrected mean error values are such that they assume only a narrowly limited number of values, for example, in the form of traffic light values "red", "yellow", "green". The value assignment of the corresponding actual error values will then also take place correspondingly.

In this manner, a contribution will also be made to avoiding a later impaired fault detection possibility if, during the determination of the reference error value, an unrecognized fault was present in the reference operating state.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
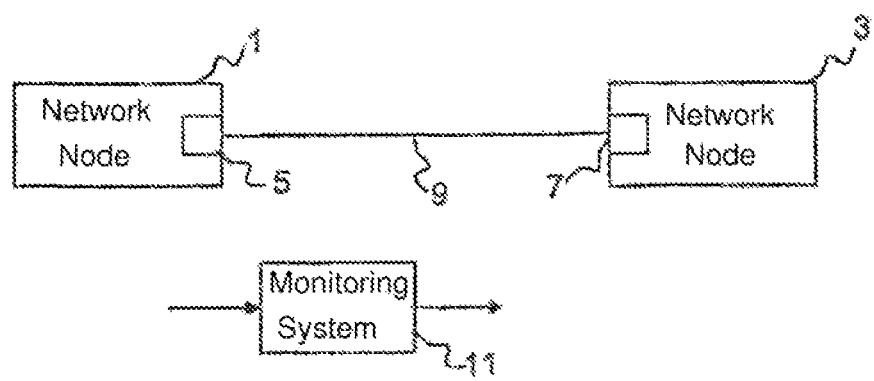
FIG. 1 is a schematic block diagram view of a network having a monitoring system.

An adaptive network (FIG. 1) is, for example, arranged in a motor vehicle. It includes several network nodes 1, 3 and network connections 9 between the network nodes. The network nodes 1, 3 each have their own transceiver 5, 7. The adaptive network has, for example, an Ethernet-based design. The transceiver 5, 7 has a physical interface. The physical interface is designed for establishing physical access to the network connection 9 and impressing correspondingly modulated signals onto the network connection 9, which it will then transmit, and/or for receiving corresponding analog signals. The physical interface also includes, for example, an adaptive equalizer an echo and crosstalk canceller, an automatic amplification control, and a slicer.

The adaptive equalizer comprises, in particular, a digital filter having filtering coefficients which are adapted in order to keep the bit error rate as low as possible. In particular, this takes place as a function of determined mean error values, which are determined particularly in the slicer.

The echo and crosstalk canceller is designed for cancelling or extinguishing echo and crosstalk which are generated when sending and receiving at the same time. The automatic amplification control is designed for adapting the amplification of the respectively received signals.

The slicer is designed for assigning, as a function of the respectively received signal (which, for example, is pulse-amplitude modulated, and specifically particularly PAM5-modulated), with respect to its symbol values, thus, for example, +2, +1, −1, −2 by means of reference signal values, which may, for example, amount to +1 V, +0.5 V, 0 V, −0.5 V and −1 V. In this case, the respective signal values of the received signal, which was transmitted by way of the respective network connection 9, regularly deviate from the respective reference signal values. The physical interface is designed for providing, as a function of the deviations of the received signal from the predefined reference signal values, a mean error value MSE_i, which is representative of deviations of the received signal from the predefined reference signal values.

Furthermore, the transceiver 5, 7 may also include a physical coding module, which is also called a physical coding sublayer module. It may further include a digital signal processing module.

The network normally includes a plurality of network nodes 1, 3, which, for example, in a motor vehicle, may be on the order of approximately 40 nodes. Each respective network node 1, 3 is used for the linking of a respective device, which may, for example, be a regulating or control unit of the motor vehicle, but may, for example, also be a sensor, such as video camera or a device that is provided for information or entertainment purposes, such as a radio. Furthermore, the devices may also have output units, particularly visual output units, such as a monitor. The devices may be designed, for example, for controlling the internal-combustion engine of the vehicle, for navigation, and/or for safety functions, such as an ABS, ESP and the like.

The respective network connection 9 between two respective network nodes 1, 3 is preferably designed as so-called unshielded twisted pair USTP. By means of such an Ethernet USTP network, a data transmission of up to 100 Mbit/s can be implemented.

A monitoring system 11, which can also be called a system for monitoring the adaptive network, is assigned to the adaptive network. The monitoring system 11 has inputs by way of which it can receive particularly the mean error values MSE_i provided by the respective transceivers 5, 7 of the respective network nodes 1, 3, in order to further process these error values MSE_i. In addition, particularly further operating variables of the motor vehicle are also supplied to the monitoring system 11. The monitoring system 11 has a data and program memory and an arithmetic unit. At least one program is stored in the data and program memory, which program can be executed during the operation of the monitoring system in the arithmetic unit.

Figure 2:
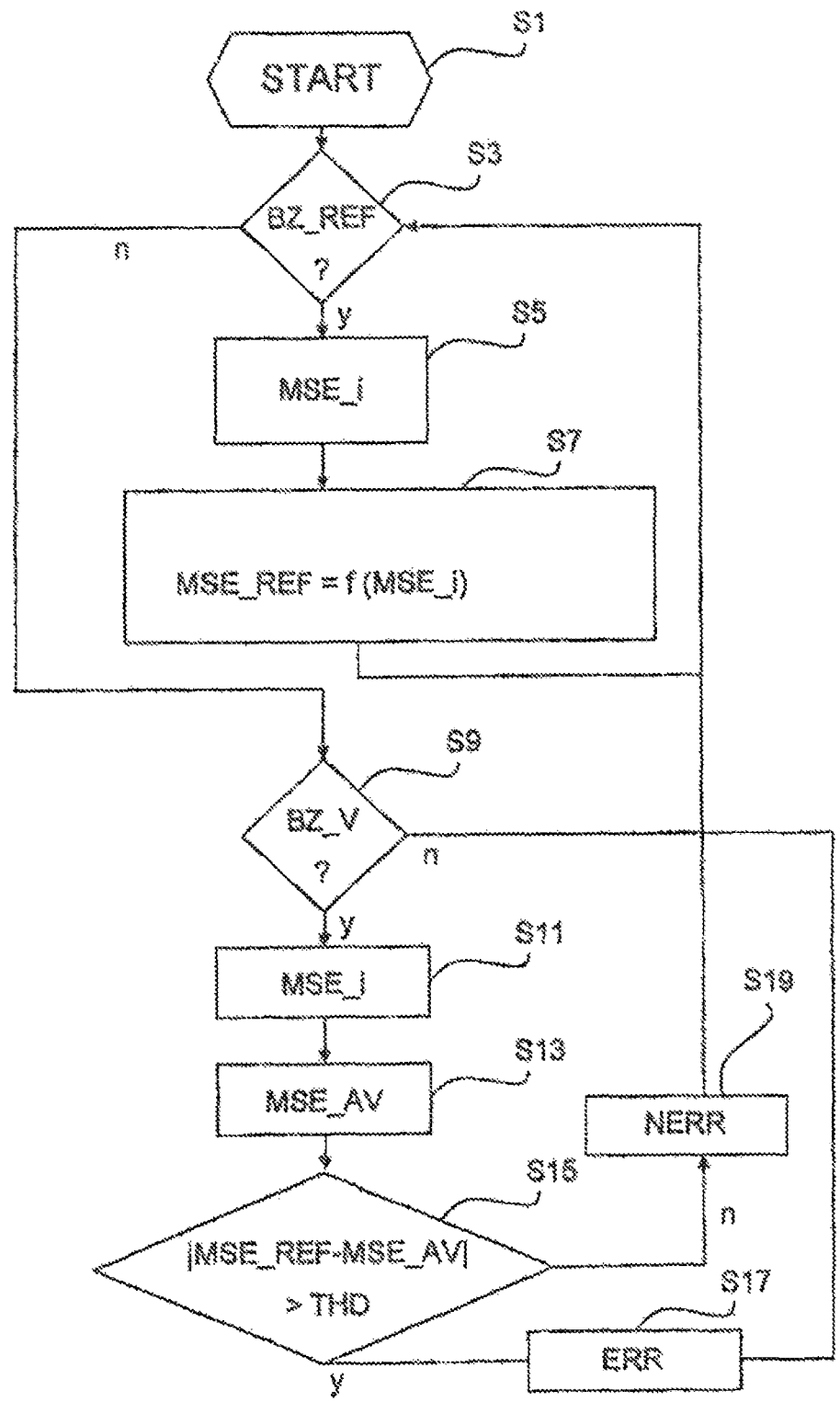
FIG. 2 is a flow chart of a program which can be executed in the monitoring system.

By means of FIG. 2, a flow chart of the program is explained in detail, which is executed in the monitoring system.

The program is started in Step S1, in which, as required, variables can be initialized.

The now explained approach relates particularly to a network node, thus, for example, the network node 1. With respect to the other network nodes 3 and the transceivers 5, 7 formed therein, preferably one corresponding program respectively is run in the monitoring system.

In Step S3, it is checked whether a reference operating state BZ_REF of the adaptive network is present. In this context, the reference operating state BZ_REF is, for example, present when the motor vehicle is in a quasi-finished state and is situated, for example, at the end of the conveyor belt. If the adaptive network is in the reference operating state BZ_REF, the processing will be continued in Step S5, in which the respective provided mean error value MSE_i, in particular, is intermediately stored in the data and program memory.

Furthermore, in Step S5, several respective mean error values MSE_i can also be provided at time intervals and can then be intermediately stored in the program and data memory.

In Step S7, as a function of the mean error value or values MSE_i stored in Step S5 in the program and data memory, a respective reference error value MSE_REF is determined. For this purpose, an averaging can, for example, take place of the mean error values MSE_i stored in Step S5, if several mean error values MSE_1 were stored in Step S5.

Preferably, the provided respective mean error value MSE_i is a quadratic mean error value which is, in each case, a function of deviations of the signal received by the respective transceiver 5, 7 from the predefined reference signal values.

Optionally, it is further checked in Step S7 whether the determined reference error value MSE_REF is in a predefined reference value range, which is appropriately predefined, and can be determined, for example, by corresponding tests or simulation. If the respective reference error value MSE_REF is outside the predefined reference value range, an error entry is preferably made, which will then, for example, have the result that the respective vehicle will be subjected to another check or to an exchange of different components of the network.

However, if the reference fault value MSE_REF is within the predefined reference value range, the processing will again be continued in Step S3.

If, when implementing Step S3, the reference operating state BZ_REF has not been taken up, the processing is continued in a Step S9.

In Step S9, it is checked whether a predefined operating state of the adaptive network is present. The predefined operating state BZ_V may, for example, be a starting operation which, for example, is correlated with an engine start of the motor vehicle, in which the adaptive network is arranged. It may also be taken up in correlation with a corresponding actuating of the access control system to the vehicle and/or an actuating of the ignition key.

If the condition of Step S9 has not been met, the processing, as required, after a predefined waiting period, is continued again in Step S3.

On the other hand, if the condition of Step S9 has been met, at least one mean error value MSE_i will be detected in Step S11, which is provided by the transceiver 5, 7 of the respective network node 1, 3. Corresponding to the approach of Step S5, also in Step S11, several mean error values MSE_i, which are successively provided with respect to time, may be stored in the program and data memory of the monitoring system 11.

In a Step S13, as a function of the mean error value or values MSE_i stored in Step S11 in the program and data memory, a respective actual error value MSE_AV is determined. Preferably, in Step S13, an actual error value MSE_AV already determined during the last implementation of Step S13 is adapted as a function of the respective mean error value or values MSE_i, which were stored in Step S11. This can be carried out, for example, in the form of a corresponding average-value formation, particularly a sliding average value formation.

In a subsequent Step S15, it is checked whether the amount of the deviation between the respective reference error value MSE_REF and the actual error value MSE_AV exceeds a predefined threshold value THD. If this is so, an error (fault) condition in the respective network connection 9 is detected in a Step S17. Otherwise, a non-error (non-fault) condition NERR is recognized in the respective network connection. By means of this approach, the fault condition ERR or the non-fault condition NERR can be detected particularly reliably because, in the reference operating state BZ_REF, if the reference error value MSE_REF is within the predefined reference value range, it is to be assumed that the network connection 9 between the respective network nodes 1, 3 is fault-free and therefore then represents the suitable reference for the respective individual adaptive network with respect to the later comparison in Step S15. Furthermore, as a result of the explained determining of the actual error value MSE_AV, a contribution is easily made to ensuring that the actual error value MSE_AV is representative of faults in the respective network connection 9 when its amount deviates by more than the threshold value THD from the reference error value MSE_REF and is not representative of the influence of interfering radiation on the network connection 9. In this manner, a respective interference irradiation can therefore be appropriately compensated by means of the adaptive network; however, in the event of an actual presence of a fault in the network connection 9, this fault can be reliably recognized.

Such faults in the network connection are particularly a fault in a respective cable of the network connection 9 and/or a plug contact. Such a fault may, for example, be caused by corrosion or a poor connection, for example by a loosening of a plug contact. By the recognition of either the fault condition ERR or the non-fault condition NERR in the respective network connection 9, by means of corresponding signaling to the driver and/or by a corresponding fault entry into a fault memory, a simple elimination of the fault becomes possible by a corresponding exchange of the respective faulty component, thus, for example, of the entire respective network connection 9. In this manner, interferences, which may be caused by a correspondingly changed interference radiation of the network connection 9, for example, with respect to a radio reception can be avoided or at least easily eliminated.

A transceiver is, for example, constructed as a gigabit Ethernet transceiver.

LIST OF REFERENCE SYMBOLS 1, 3 Network nodes
5,7 Transceiver
9 Network connection
11 Monitoring system
S1-S19 Steps
BZ_REF Reference operating state
MSE_i Mean error value
MSE_REF Reference error value
BZ_V Predefined operating state
MSE_AV Actual error value
THD Threshold value
ERR Error (fault) condition in the respective network connection
NERR Non-error (non-fault) condition in the respective network connection The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring an adaptive network having respective network nodes and network connections between the network nodes, each network node having a transceiver coupled to a respective network connection, the transceiver being configured to provide a mean error value representative of deviations of a received signal from the defined reference signal values, the method comprising the acts of:

in a reference operating state of the adaptive network, determining a respective reference error value as a function of the mean error value provided by a respective transceiver;

in at least one predefined operating state of the adaptive network, determining a respective actual error value as a function of the mean error value provided by the respective transceiver; and determining whether a fault is present in the respective network connection coupled to the respective transceiver as a function of the respective reference error value and the assigned actual error value.

2. The method according to claim 1, wherein the act of determining whether a fault is present is carried out by determining whether an amount of deviation between the respective reference error value and the assigned actual error value exceeds a predefined threshold value.

3. The method according to claim 1, further comprising the act of:

in the predefined operating state, using a then provided mean error value to adapt the respective actual error value.

4. The method according to claim 3, wherein the adapting of the respective actual error value is carried out by a sliding average value formation.

5. The method according to claim 3, wherein a respective provided mean error value is a quadratic mean error value.

6. The method according to claim 3, further comprising the act of:

correcting the mean error values, via a predefined filtering function, as a basis for determining the respective reference error value and/or the respective actual error value.

7. The method according to claim 6, wherein the adapting of the respective actual error value takes place as a function of a predefined weighting of deviations of a predefined extent in the case of the mean error values or the mean error values corrected via the predefined filtering function.

8. The method according to claim 1, wherein in the reference operating state, the determined reference error value is checked for being within a predefined reference value range, and if the determined reference error value is outside the predefined reference value range, it is concluded that there is a fault in the network connection and/or the network node.

9. The method according to claim 1, wherein the predefined operating state is a starting operation correlating with an engine start of a motor vehicle in which the adaptive network is arranged.

10. The method according to claim 1, wherein the predefined operating state correlates with a change of a connection status of the respective network connection from a link-up to a link-down status or vice-versa.

11. The method according to claim 1, wherein the predefined operating state is present when the network nodes situated at end points of a respective network connection each have a predefined functional network node operating state.

12. The method according to claim 1, wherein the predefined operating state depends on at least one predefined vehicle function having a predefined state outside the network.

13. The method according to claim 1, wherein the adaptive network is Ethernet-based.

14. A method for monitoring an adaptive network having respective network nodes and network connections between the network nodes, each network node having a transceiver coupled with a respective network connection, the transceiver being configured to provide a mean error value representative of deviations of a received signal from predefined reference signal values, the method comprising the acts of:

provide a respective reference error value;

in at least one predefined operating state of the adaptive network, determining a respective actual error value as a function of the mean error value provided by the respective transceiver; and as a function of the respective reference error value and the assigned actual error value, determining whether a fault is present in the respective network connection coupled with the respective transceiver.

15. A system for monitoring an adaptive network, comprising:

network nodes;

network connections extending between the network nodes;

each network node having a transceiver coupled with a respective network connection, the transceiver being configured to provide a mean error value representative of deviations of a received signal from predefined reference signal values, wherein in a reference operating state of the adaptive network, a respective reference error value is determined as a function of the mean error value provided by the respective transceiver, in at least one predefined operating state of the adaptive network, a respective actual error value is determined as a function of the mean error value provided by the respective transceiver, and as a function of the respective reference error value and the assigned actual error value, a fault determination is made as to whether there is a fault in the respective network connection coupled to the respective transceiver.

* * * * *